(12) United States Patent
Ayanam et al.

(10) Patent No.: US 9,281,999 B2
(45) Date of Patent: Mar. 8, 2016

(54) APPARATUS FOR REMOTELY CONFIGURING NETWORK INTERFACES IN A REMOTE MANAGEMENT SYSTEM

(75) Inventors: Varadachari Sudan Ayanam, Suwanee, GA (US); Baskar Parthiban, Johns Creek, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 543 days.

(21) Appl. No.: 13/154,221

(22) Filed: Jun. 6, 2011

(65) Prior Publication Data

US 2012/0084408 A1    Apr. 5, 2012

Related U.S. Application Data

(60) Provisional application No. 61/388,500, filed on Sep. 30, 2010.

(51) Int. Cl.
| | |
|---|---|
| *G06F 15/177* | (2006.01) |
| *G06F 15/173* | (2006.01) |
| *G06F 15/16* | (2006.01) |
| *H04L 12/24* | (2006.01) |
| *G06F 9/445* | (2006.01) |

(52) U.S. Cl.
CPC ........ H04L 41/0803 (2013.01); H04L 41/0668 (2013.01); *G06F 9/44505* (2013.01); *H04L 41/08* (2013.01)

(58) Field of Classification Search
CPC . H04L 41/0668; H04L 41/08; H04L 41/0803; G06F 9/44505

USPC .......................................... 709/220-226, 250
See application file for complete search history.

(56) References Cited

U.S. PATENT DOCUMENTS

| | | |
|---|---|---|
| 5,768,568 A | 6/1998 | Inui et al. |
| 6,356,965 B1 | 3/2002 | Broyles et al. |
| 6,385,682 B1 | 5/2002 | Emerson et al. |

(Continued)

OTHER PUBLICATIONS

Ylitalo, J.; Jokikyyny, T.; Kauppinen, T.; Tuominen, A.J.; Laine, J., "Dynamic network interface selection in multihomed mobile hosts," in System Sciences, 2003. Proceedings of the 36th Annual Hawaii International Conference on , vol., no., pp. 10 pp.-, Jan. 6-9, 2003.*

(Continued)

*Primary Examiner* — Taylor Elfervig
(74) *Attorney, Agent, or Firm* — Locke Lord LLP; Tim Tingkang Xia, Esq.

(57) ABSTRACT

According to one aspect, a computer system for remotely configuring network interfaces of a host computer is disclosed, the system including a remote management computer and a managed host computer communicatively connected to the remote management computer over a communications link. The host computer includes a first network interface operable to communicatively connect to two or more server computers on two or more corresponding port numbers, and a second network interface operable to communicatively connect to two or more server computers on two or more corresponding port numbers. The system also includes a microcontroller operatively connected to the first network interface and the second network interface. The microcontroller has a programmable processor that is programmed to cause the host computer to perform functions that include receiving configuration data from the remote management computer over the communications link.

19 Claims, 4 Drawing Sheets

(56) References Cited

U.S. PATENT DOCUMENTS

| | | | |
|---|---|---|---|
| 6,490,637 | B1 | 12/2002 | Shih |
| 6,496,858 | B1 * | 12/2002 | Frailong et al. ............... 709/221 |
| 6,560,704 | B2 | 5/2003 | Dieterman et al. |
| 6,590,861 | B1 * | 7/2003 | Vepa .................. H04L 12/4641 370/216 |
| 6,792,479 | B2 | 9/2004 | Allen et al. |
| 7,605,689 | B2 | 10/2009 | Hein et al. |
| 7,856,549 | B2 | 12/2010 | Wheeler |
| 8,115,448 | B2 | 2/2012 | John |
| 8,362,745 | B2 | 1/2013 | Tinaphong |
| 2002/0087724 | A1 * | 7/2002 | Datta et al. .................... 709/241 |
| 2003/0185233 | A1 * | 10/2003 | Ji et al. ........................... 370/466 |
| 2003/0233450 | A1 | 12/2003 | Carley |
| 2005/0091360 | A1 | 4/2005 | Chen et al. |
| 2005/0108519 | A1 | 5/2005 | Barton et al. |
| 2005/0149924 | A1 | 7/2005 | Komarla et al. |
| 2005/0188070 | A1 * | 8/2005 | Tripathi et al. ............... 709/223 |
| 2005/0257040 | A1 | 11/2005 | Choi et al. |
| 2007/0002826 | A1 * | 1/2007 | Bennett et al. ................ 370/351 |
| 2008/0021978 | A1 * | 1/2008 | Maynard et al. .............. 709/217 |
| 2008/0037553 | A1 * | 2/2008 | Gilmartin et al. ........ 370/395.41 |
| 2008/0184022 | A1 | 7/2008 | Peacock |
| 2009/0102296 | A1 | 4/2009 | Greene et al. |
| 2009/0282284 | A1 | 11/2009 | Naohiro et al. |
| 2010/0005283 | A1 | 1/2010 | Ha |
| 2010/0090656 | A1 | 4/2010 | Shearer et al. |
| 2010/0115253 | A1 | 5/2010 | Lipsky et al. |
| 2010/0180031 | A1 * | 7/2010 | Cacheria et al. .............. 709/225 |
| 2011/0055824 | A1 * | 3/2011 | Benari ........................... 717/176 |
| 2011/0202983 | A1 * | 8/2011 | Pope et al. ......................... 726/7 |
| 2011/0276625 | A1 * | 11/2011 | Shah .............................. 709/203 |
| 2011/0292807 | A1 * | 12/2011 | Shah et al. .................... 370/237 |
| 2011/0296130 | A1 * | 12/2011 | Abe et al. ...................... 711/165 |

OTHER PUBLICATIONS

Khan, M.A.; Toseef, U.; Marx, S.; Goerg, C., "Auction based interface selection with Media Independent Handover services and flow management," in Wireless Conference (EW), 2010 European , vol., no., pp. 429-436, Apr. 12-15, 2010.*

Venkitaraman, N.; Almaula, J.; Haneef, A.; Mysore, J., "Session aware network controlled interface selection for multihomed hosts," in Wireless Communications and Networking Conference, 2004. WCNC. 2004 IEEE , vol. 4, no., pp. 1963-1968 vol. 4, Mar. 21-25, 2004.*

* cited by examiner

APPARATUS FOR REMOTELY CONFIGURING NETWORK INTERFACES IN A REMOTE MANAGEMENT SYSTEM

CROSS-REFERENCE TO RELATED PATENT APPLICATION

This application claims priority to and the benefit of, pursuant to 35 U.S.C. §119(e), U.S. Provisional Patent Application Ser. No. 61/388,500, filed Sep. 30, 2010, entitled "METHOD AND APPARATUS FOR CONFIGURING SERVER PORTS IN A REMOTE MANAGEMENT SYSTEM," by Varadachari Sudan Ayanam and Baskar Parthiban, the disclosure of which is herein incorporated by reference in its entirety.

FIELD OF THE INVENTION

The present invention generally relates to remote management computing, and more particularly to remotely configuring network interfaces of a managed host computer.

BACKGROUND OF THE INVENTION

A management computer may be operatively connected through a computer network to a management controller such as a baseboard management controller (BMC) of a remotely managed host computer. Network interfaces on the managed host computer are operatively coupled to the management controller and may be communicatively connected to server computers which provide services such as keyboard, video, and mouse (KVM) console redirection and CD/DVD redirection, each service having a corresponding port number. A remotely located user of the management computer may require that only certain available services be provided, and that only one available network interface be utilized. Accordingly, the user may desire to change particular configuration settings for network interfaces that are to be exposed for active use, rather than being restricted to default configurations set by a manufacturer. For example, the user may want to customize the number and type of services to be provided on a particular network interface, as well as the corresponding port numbers. There further exists a need for configuration changes to be made remotely without the need for a network administrator to be present at the physical location of the network interfaces. Also, a simple interface is needed for making the changes on the remote management computer, and there is a need for the changes to take effect without rebooting the management controller.

Therefore, a heretofore unaddressed need still exists in the art to address the aforementioned deficiencies and inadequacies.

SUMMARY OF THE INVENTION

In one aspect, the present invention relates to a computer system for remotely configuring network interfaces of a host computer. In one embodiment, the system includes a remote management computer and a managed host computer communicatively connected to the remote management computer over a communications link. The host computer includes a first network interface operable to communicatively connect to two or more server computers on two or more corresponding port numbers, and a second network interface operable to communicatively connect to two or more server computers on two or more corresponding port numbers. The system also includes a microcontroller operatively connected to the first network interface and the second network interface. The microcontroller has a programmable processor that is programmed to cause the host computer to perform functions that include receiving configuration data from the remote management computer over the communications link. The configuration data includes a selection of two or more services to be provided to the host computer from the server computers, a selection of a network interface, from among the first network interface and the second network interface, to be communicatively connected to the server computers, and a selection of two or more port numbers on the selected network interface on which the selected services are to be provided to the host computer. The programmable processor of the microcontroller is also programmed to cause the host computer to configure the selected network interface according to the configuration data.

In one embodiment, the programmable processor is further programmed to cause the host computer to communicatively connect the server computers to the selected network interface such that the selected services are provided to the host computer.

In one embodiment, the function of configuring the selected network interface is performed during continuous operation of the microcontroller.

In one embodiment, one or more of the selections included in the configuration data are generated in response to an interaction of a user with the remote management computer.

In one embodiment, the selections corresponding to the user are generated in response to an interaction of the user with a web interface application executing on the remote management computer.

In one embodiment, the communications link includes an internet connection.

In one embodiment, the selected services include one or more of keyboard, video, and mouse (KVM) console redirection, text console redirection, mass storage redirection, floppy drive redirection, USB flash drive redirection, and CD/DVD redirection.

In one embodiment, the microcontroller is configured to function as a management controller for the host computer.

In one embodiment, the first network interface and the second network interface reside on the microcontroller.

According to another aspect, the present invention relates to a microcontroller for configuring network interfaces of a managed host computer communicatively connected to a remote management computer over a communications link. In one embodiment, the microcontroller includes a first network interface operable to communicatively connect to one or more server computers on one or more corresponding port numbers, and a second network interface operable to communicatively connect to one or more server computers on one or more corresponding port numbers. The microcontroller also has a programmable processor that is programmed to cause the host computer to perform functions that include receiving configuration data from the remote management computer over the communications link, where the configuration data includes selection of two or more services to be provided to the host computer from the server computers. The configuration data further includes a selection of a network interface, from among the first network interface and second network interface, to be communicatively connected to the server computers, and two or more port numbers, on the selected network interface, on which the selected services are to be provided to the host computer. The programmable processor is further programmed to cause the host computer to configure the selected network interface according to the configuration data.

In one embodiment, the microcontroller is also programmed to cause the host computer to communicatively connect the server computers to the selected network interface such that the selected services are provided to the host computer.

In one embodiment, the function of configuring the selected network interface is performed during continuous operation of the microcontroller.

In one embodiment, one or more of the selections in the configuration data are generated in response to an interaction of a user with the remote management computer.

In one embodiment, the one or more selections corresponding to the user are generated in response to an interaction of the user with a web interface application executing on the remote management computer.

In one embodiment, the communications link includes an internet connection.

In one embodiment, the selected services include one or more of keyboard, video, and mouse (KVM) console redirection, text console redirection, mass storage redirection, floppy drive redirection, USB flash drive redirection, and CD/DVD redirection.

In yet another aspect, the present invention relates to a computer-readable medium with stored computer-executable instructions which, when executed by a programmable processor, cause a microcontroller of a managed host computer having a first network interface and second network interface and communicatively connected to a remote management computer over a communications link to perform functions that include receiving configuration data from the remote management computer over the communications link. The configuration data includes a selection of two or more services to be provided to the host computer from two or more corresponding server computers, and a selection of a network interface, from among the first network interface and second network interface, to be communicatively connected to the server computers. The configuration data also includes a selection of two or more port numbers, on the selected network interface, on which the selected services are to be provided to the host computer. The computer-readable medium also includes computer-executable instructions which, when executed by the programmable processor, cause the microcontroller to configure the selected network interface according to the configuration data.

In one embodiment, the computer-readable medium further includes instructions which, when executed by the programmable processor, cause the microcontroller to communicatively connect the server computers to the selected network interface such that the selected services are provided to the host computer.

In one embodiment, the function of configuring the selected network interface is performed during continuous operation of the microcontroller.

In one embodiment, one or more of the selections in the configuration data are generated in response to an interaction of a user with a web interface application executing on the remote management computer.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
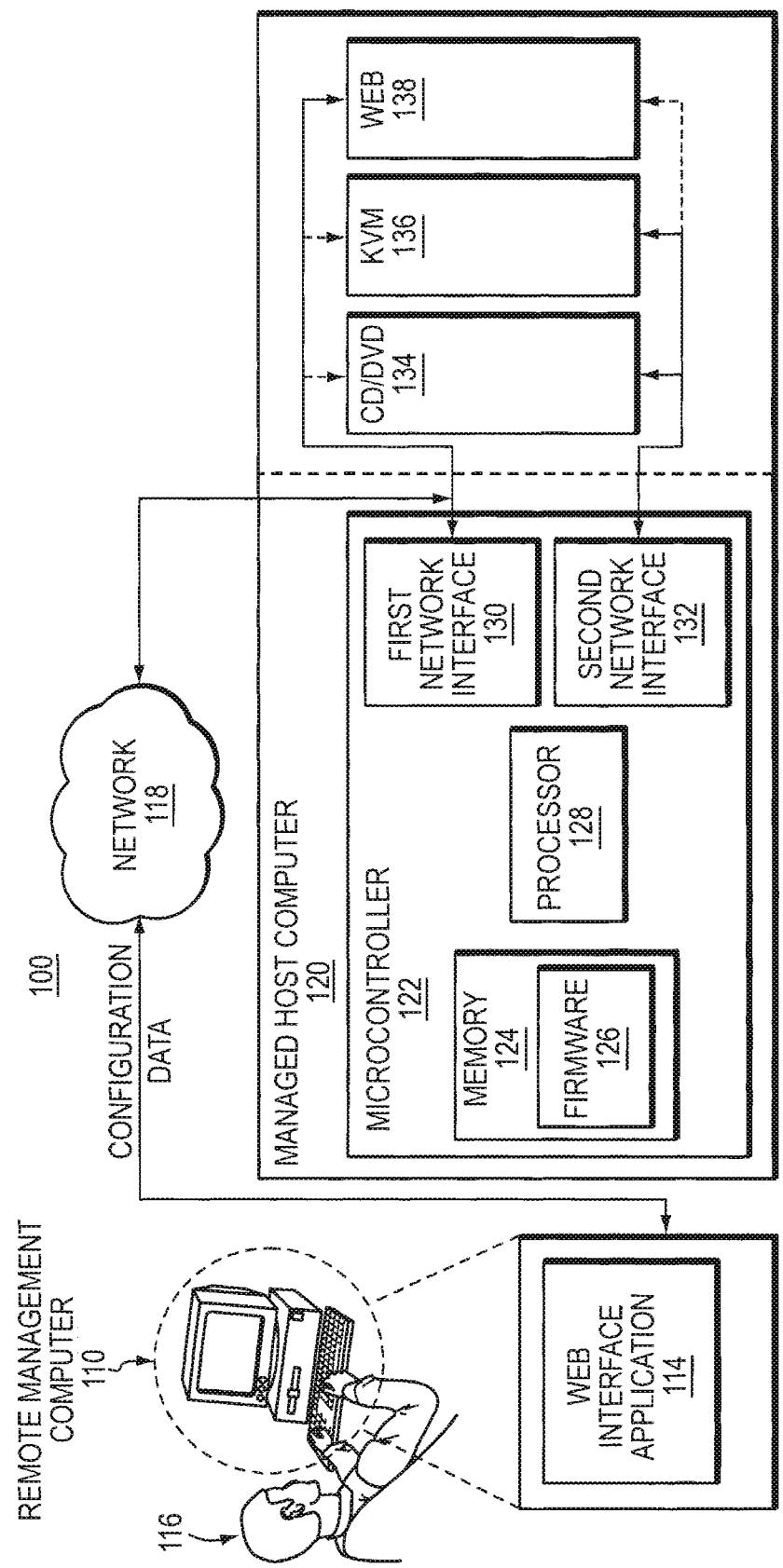
FIG. 1 schematically shows a computer system for remotely configuring network interfaces of a host computer, according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. The description will be made as to the embodiments in conjunction with the accompanying drawings in FIGS. 1-4.

Now referring specifically to FIG. 1, a computer system 100 is operable for remotely configuring network interfaces of a host computer, according to one embodiment of the present invention. As shown, a managed host computer 120 is communicatively connected to a remote management computer 110 over a communications link 118, for example via network cables through network 118, which may connect to the internet or a local intranet. The host computer 120 includes a microcontroller 122 having a first network interface 130 that is operable to communicatively connect to two or more server computers 134, 136, 138 on two or more corresponding port numbers. The host computer 120 further includes a second network interface 132 that is operable to communicatively connect to two or more of the server computers 134, 136, 138 on two or more corresponding port numbers. The connections between the server computers 134, 136, 138 and the first network interface 130 and second network interface 132 may include WAN or LAN communication links. One or more of the first network interface 130 and second network interface 132 may include an Ethernet network adapter, as one particular example and further described with reference to the embodiment shown in FIG. 4. Those skilled in the art will recognize that a port is an application-specific or process-specific software construct serving as a communications endpoint, where a specific port is identified by its number. Various commonly used port numbers are reserved by convention to identify specific service types on a host computer. For example, HTTP commonly uses port 80 and HTTPS uses port 443 by default.

In the embodiment shown in FIG. 1, the server computer 134 operates as a CD/DVD server for emulating local storage, the server computer 136 operates as a keyboard, video, and mouse (KVM) server for providing graphical console redirection, and the server computer 138 operates as a web server. The computer servers 134, 136, and 138 may be further configured to provide alternative or additional services such as text console redirection, mass storage redirection, floppy drive redirection, and/or USB flash drive redirection.

It should be appreciated that the server computers 134, 136, and 138 and microcontroller 122 may be arranged in a rack-mount configuration, that is, collectively provided in a mounting chassis. The microcontroller 122 includes a programmable processor 128 that is programmed to cause the host computer 120 to perform functions that include receiving configuration data from the remote management computer 110, over the communications link 118. In the embodiment shown, the microcontroller 122 is configured to function as a baseboard management controller (BMC) for the managed host computer 120.

The configuration data includes a selection of two or more services to be provided to the host computer 120 from the server computers 134, 136, 138, a selection of a network interface, from among the first network interface 130 and the second network interface 132 to be communicatively connected to the server computers 134, 136, 138, and a selection of two or more port numbers on the selected network interface on which the selected services are to be provided to the host computer 120. One or more of the selections included in the configuration data are generated in response to an interaction of a user 116 with a web interface application 114 executing on the remote management computer 110. For example, a list of active network interfaces, available services, and available port numbers may be remotely viewed and customized through a graphical user interface window, to be selected by the user 116. The functionality of the web interface application 114 may be incorporated into a remote management browser plug-in that can be executed in a standard web browser program such as Internet Explorer® from Microsoft® Corporation of Redmond, Wash. The functionality providing the available selections may be hosted on a web-based site accessible through http via the web interface application 114. According to the connections shown in the exemplary embodiment of FIG. 1, the 116 user may select a web service to be provided on the first network interface 130, shared with functionality to connect with the remote management computer 110 over the network 118, also on the first network interface 130. The user 116 may also select KVM redirection and CD/DVD redirection services to share the second network interface 132 connection. As indicated by dashed arrows to server computers 134, 136, and 138, in an alternative example, the user 116 may select for the second network interface 132 to serve as a dedicated interface on which the web service is provided from server computer 138, while the first network interface 130 is used to provide both the CD/DVD redirection service from server computer 134 and KVM redirection service from server computer 136. Through interaction with the web interface application 114, the user 116 may alternatively or additionally select the port numbers on which the selected services are to be provided, which otherwise are automatically set to correspond to default port numbers for the respective services, according to default port numbers set by the manufacturer or according to common convention.

Figure 4:
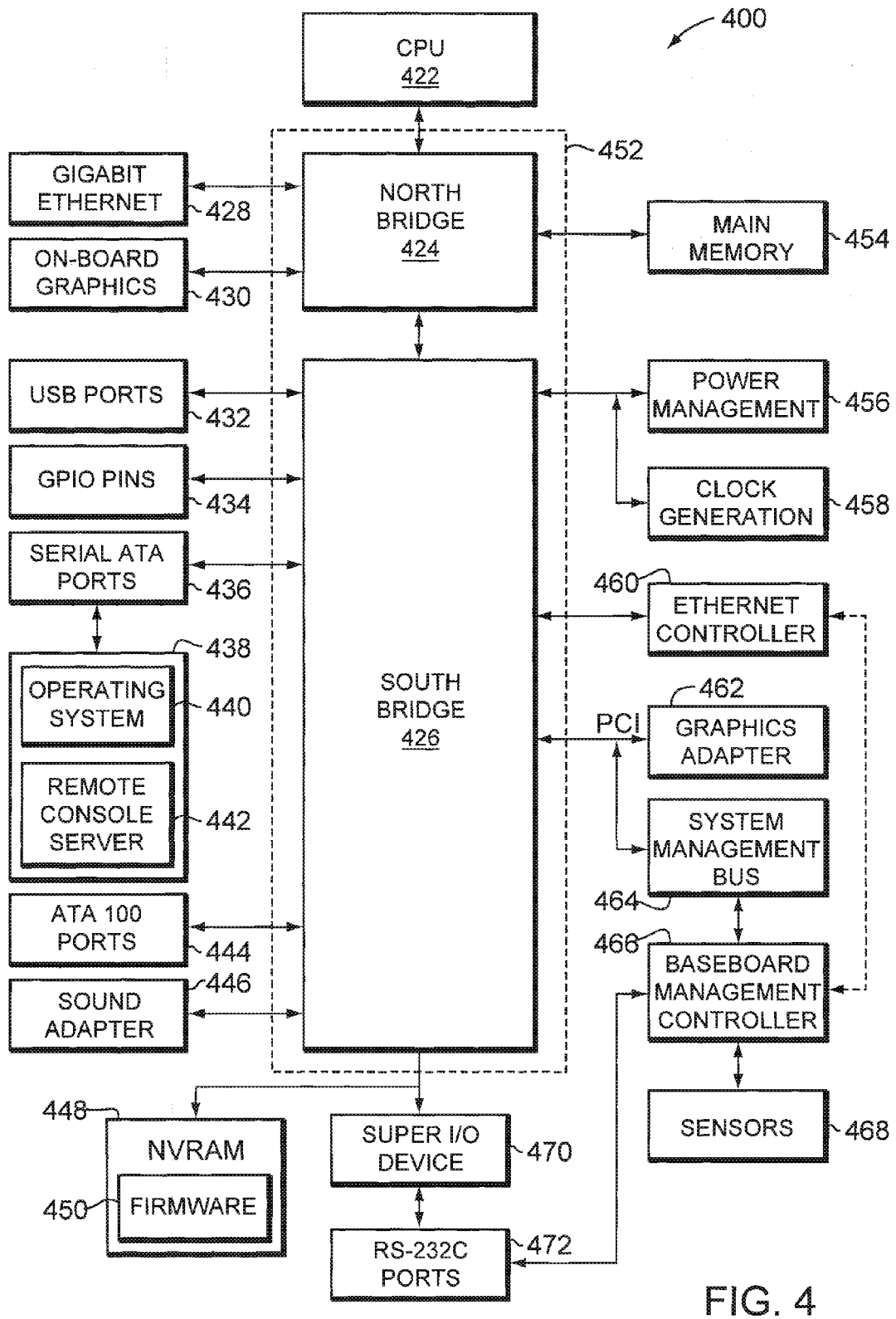
FIG. 4 schematically shows architecture of a computer system according to one or more embodiments of the present invention.

Again referring to the embodiment shown in FIG. 1, the microcontroller 122 includes a memory 124 such as a NVRAM for storing firmware 126 as further described in reference to FIG. 4. The programmable processor 128 of the microcontroller 122 is programmed to cause the host computer 120 to configure one or more of the network interfaces 130, 132 according to the configuration data, and to cause the host computer 120 to communicatively connect the server computers 134, 136, 138 to the respective network interfaces such that the selected services are provided to the host computer according to selections included in the configuration data. The function of configuring the selected network interface is performed during continuous operation of the microcontroller 122, that is, without requiring a reboot of the microcontroller 122. Further discussion of exemplary components and function of the remote management computer 110 and/or managed host computer 120 can be found below with reference to the exemplary embodiment shown in FIG. 4.

Figure 2:
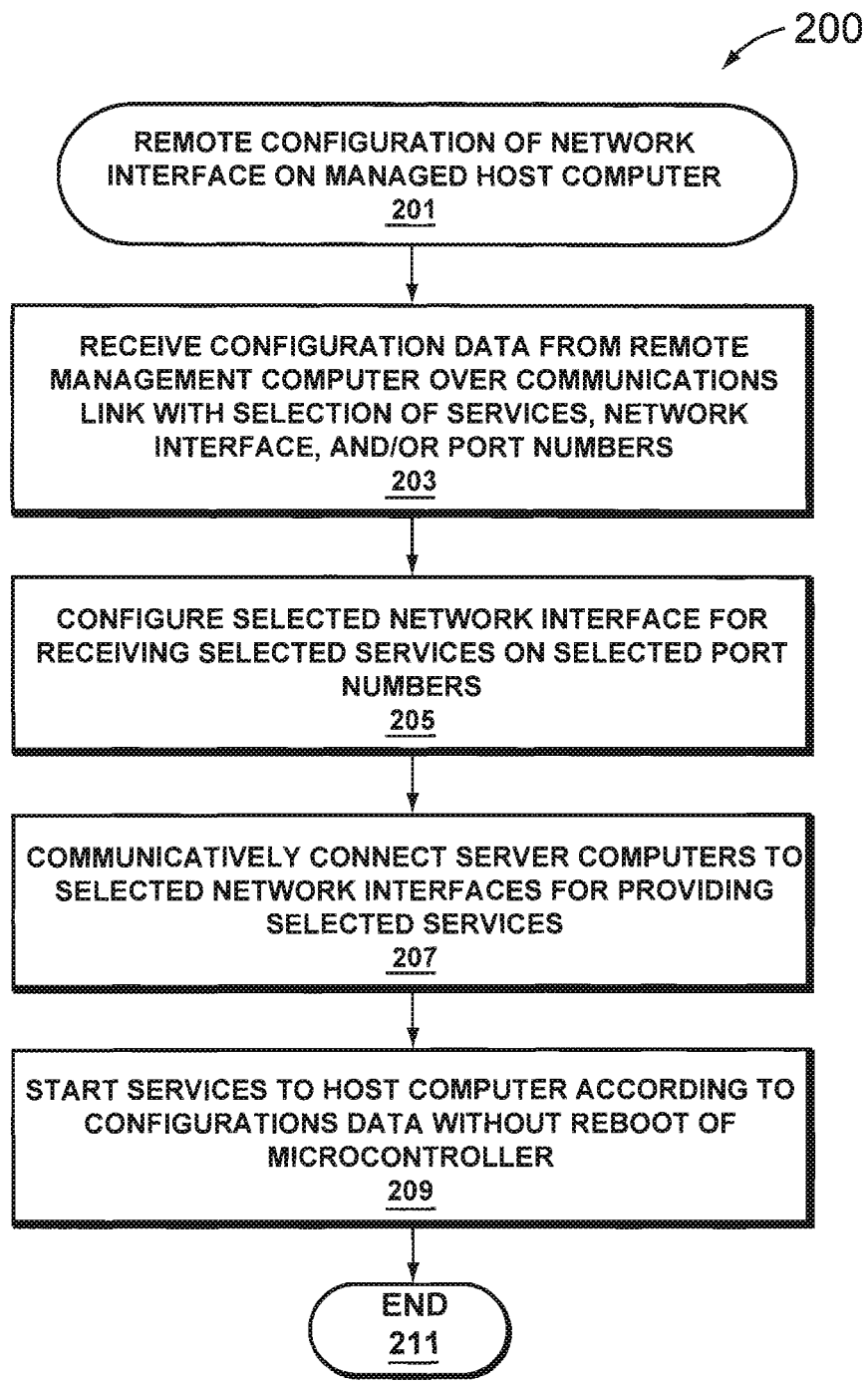
FIG. 2 is a flow chart illustrating operational steps of a computer-implemented method for remote configuration of network interfaces on a managed host computer, according to one embodiment of the present invention.

The flow chart of FIG. 2 illustrates operational steps of a computer-implemented method 200 according to one embodiment of the present invention, for remote configuration of network interfaces such as the first network interface 130 and second network interface 132 in the embodiment shown in FIG. 1, on a managed host computer such as the managed host computer 120 that is communicatively connected to the remote management computer 110. In one embodiment, the programmable processor 128 of the microcontroller 122 shown in FIG. 1 is programmed to cause the managed host computer 120 to perform the operational steps. As shown, the method begins at step 201 and then proceeds to step 203, where configuration data is received from a remote management computer over a communications link, the communication data including selections for services to be provided by respective server computers, and network interfaces and port numbers on which the selected services are to be provided. From step 203, operation proceeds to step 205, where the selected network interfaces are configured for having the selected services provided on the selected port numbers. From step 205, operation proceeds to step 207, where active communicative connections are enabled between the selected network interfaces and the selected servers providing the selected services. Operation proceeds from step 207 to step 209, where the selected services are actively started and provided to the host computer from the server computers, and such that the services are restarted according to the selected configuration without requiring restart/reboot of the microcontroller, and then the operation ends at step 211.

Figure 3:
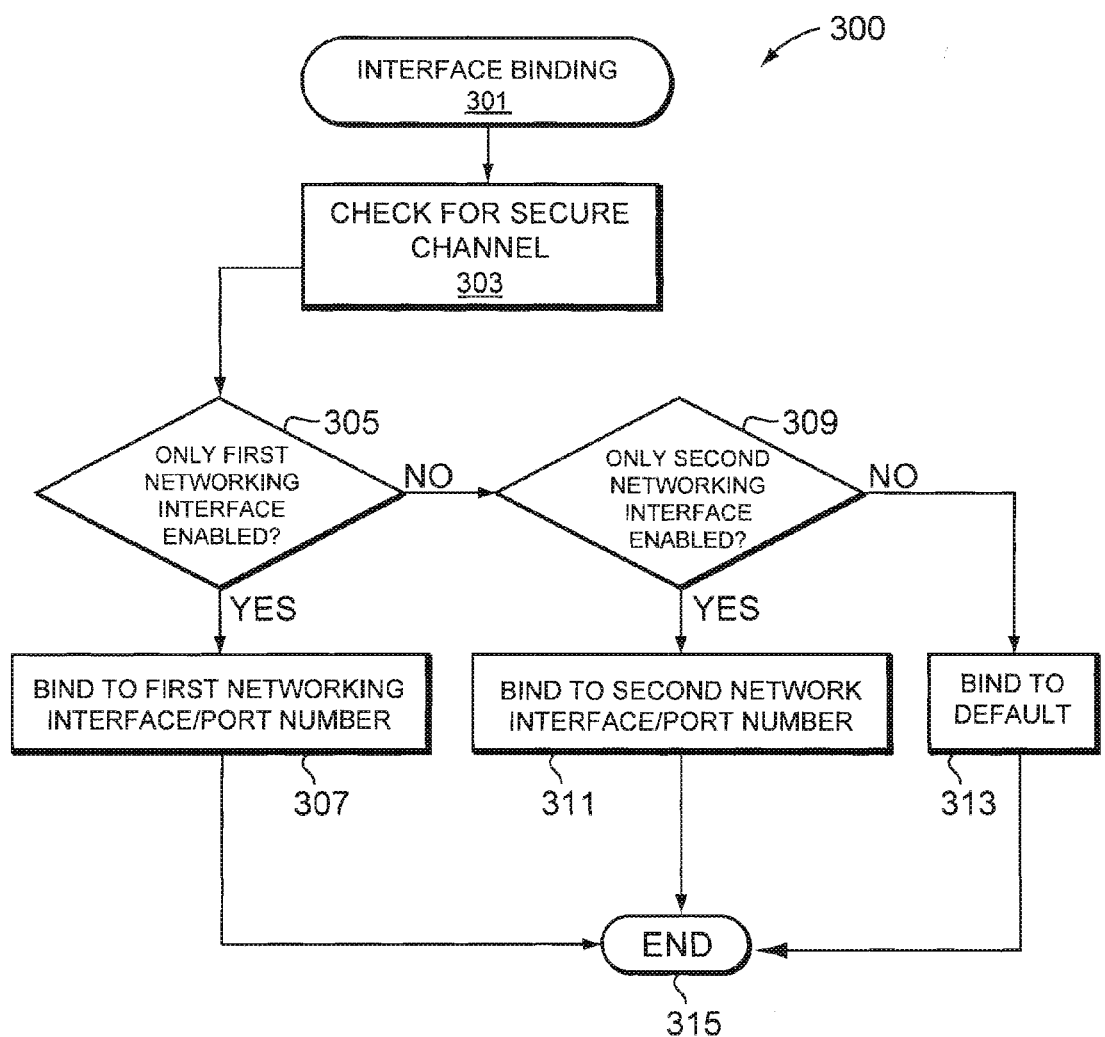
FIG. 3 is a flow chart illustrating operational steps of a computer-implemented method for interface binding, according to one embodiment of the present invention.

Now referring specifically to FIG. 3, operational steps of a computer-implemented method 300 are shown, the method for network interface binding by implementing binding logic according to one embodiment of the present invention. In one exemplary embodiment, a programmable processor of a microcontroller, such as the programmable processor 128 of the microcontroller 122 shown in FIG. 1, is programmed to execute the operational steps of the method for causing a managed host computer such as managed host computer 120 in FIG. 1 to bind enabled network interfaces, such as the first network interface 130 and/or second network interface 132, on respective port numbers for providing corresponding services from connected server computers such as server computers 134, 136, and 138. In one exemplary embodiment, the services include one or more of CD/DVD redirection, KVM redirection, web service, text console redirection, mass storage redirection, floppy drive redirection, and/or USB flash drive redirection. As shown, operation begins at step 301 and then proceeds to step 303, where a determination is made whether a secure channel is enabled. If there is an enabled secure channel, then a connection is established with the secure channel for performing the subsequent functions. However, if a secure channel is not available, the functions proceed over a non-secure communications channel. At step 305, a determination is made whether the first network interface is the only enabled network interface of the microcontroller. If the first network interface is the only enabled network interface, then operation proceeds along the "Yes" path from step 305 to step 307, where binding is effected on particular port numbers on the first network interface for providing a particular service, and then operation ends at step 315. If the first network interface is not enabled, then operation proceeds along the "No" path from step 305 to step 309, where a determination is made whether the second network interface is the only enabled network interface. If the second network interface is the only enabled network interface, then operation proceeds along the "Yes" path from step 309 to step 311, where binding is effected on particular port numbers on the second network interface for providing a particular service and then operation ends at step 315. If it is determined that neither the first network interface nor the second network interface is the only enabled interface, then binding to default port numbers is effected at step 313 and then operation ends at step 315.

Now referring specifically to FIG. 4, a computer architecture is schematically shown for various computing systems utilized according to one or more embodiments of the present invention. It should be appreciated that although the embodiments described herein are discussed in the context of server computers, other types of computing devices may be utilized. Further, those skilled in the art will recognize that the architecture shown in FIG. 4 may be utilized to embody a managed host computer or a remote management computer.

The architecture shown in FIG. 4 corresponds to a computer 400 having a baseboard, or "motherboard", which is a printed circuit board to which components or devices may be connected by way of a system bus or other electrical communication path. In one embodiment, a central processing unit ("CPU") 422 operates in conjunction with a chipset 452. The CPU 422 is a standard central processor that performs arithmetic and logical operations necessary for the operation of the computer. The chipset 452 includes a north bridge 424 and a south bridge 426, where the north bridge 424 provides an interface between the CPU 422 and the remainder of the computer 400. The north bridge 424 also provides an interface to a random access memory ("RAM") used as the main memory 454 in the computer 400 and, optionally, to an onboard graphics adapter 440. The north bridge 424 may also include functionality for providing networking functions through a gigabit Ethernet adapter 428. The gigabit Ethernet adapter 428 is operative to connect the computer 400 to another computer via a network. Connections which may be made by the network adapter 428 include LAN or WAN connections. As shown, the north bridge 424 is connected to the south bridge 426.

The south bridge 426 is operative to control many of the input/output functions of the computer 400. In particular, the south bridge 426 may provide one or more universal serial bus ("USB") ports 442, an Ethernet controller 460, and one or more general purpose input/output ("GPIO") pins 444. The south bridge 426 may also provide a bus for interfacing peripheral card devices such as a graphics adapter 462. In one embodiment, the bus comprises a peripheral component interconnect ("PCI") bus. The south bridge 426 may also provide a system management bus 464 for use in managing the various components of the computer 400, and a power management module 456.

The south bridge 426 is also operative to provide one or more interfaces for connecting mass storage devices to the computer 400. For instance, according to an embodiment, the south bridge 426 includes a serial advanced technology attachment ("SATA") adapter for providing one or more serial ATA ports 446. The serial ATA ports 446 may be, in turn, connected to one or more mass storage devices storing an operating system 440 and application programs 442, such as the SATA disk drive 448. Those skilled in the art will recognize that an operating system 440 has a set of programs that control operations of a computer and allocation of resources. An application program is software that runs on top of the operating system software, or other runtime environment, and uses computer resources to perform application specific tasks desired by the user.

The mass storage devices connected to the south bridge 426, and their associated computer-readable media, provide non-volatile storage for the computer 400. Although the description of computer-readable media contained herein refers to a mass storage device such as a hard disk or CD-ROM drive, those skilled in the art will recognize that computer-readable media can be any available media that can be accessed by the computer 400. Computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge for connecting a "Super I/O" device 470. The Super I/O device 470 is responsible for providing a number of input/output ports, including a keyboard port, a mouse port, a serial interface 472, a parallel port, and other types of input/output ports. The LPC interface may also connect a computer storage media such as a ROM or a flash memory such as a NVRAM 448 for storing the firmware 450 that includes program code containing the basic routines that are operative to start up the computer 400 and to transfer information between elements within the computer 400.

As described briefly above, the south bridge 426 may include a system management bus 464. The system management bus 464 may include a baseboard management controller ("BMC") 466. In general, the BMC 466 is a microcontroller that monitors operation of the computer system 400. In a more specific embodiment, the BMC 466 monitors health-related aspects associated with the computer system 400, such as the temperature of one or more components of the computer system 400, speed of rotational components (e.g. spindle motor, CPU fan, etc.) within the system, the voltage across or applied to one or more components within the system 400, and the available or used capacity of memory devices within the system 400. To accomplish these monitoring functions, the BMC 466 is communicatively connected to one or more components by way of the management bus 464. In one exemplary embodiment, these components include sensor devices for measuring various operating and performance-related parameters within the computer system 400.

The management bus 464 is used by the BMC 466 to request and/or receive various operating and performance-related parameters from one or more components, which are also communicatively connected to the management bus 464. For instance, in one embodiment, the management bus 464 communicatively connects the BMC 466 to a CPU temperature sensor and a CPU fan (not shown in FIG. 4), thereby providing a means for the BMC 466 to monitor and/or control operation of these components. The BMC 466 may be directly connected to sensors 468. The serial ports 472 and the Ethernet controller 460 may be utilized to establish a connection with the BMC 466.

It should be appreciated that the computer 400 may comprise other types of computing devices known to those skilled in the art. It is also contemplated that the computer 400 may not include all of the components shown in FIG. 4 and/or may include other components that are not explicitly shown in FIG. 4.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A non-transitory computer-readable medium having computer-executable instructions stored thereon which, when executed by a processor, cause a baseboard management controller (BMC) of a host computer to perform functions comprising:
   (a) receiving, from a remote management computer over a communications link, configuration data for a first server of the at least two servers, wherein the configuration data comprises:
      (i) an indication of the first server specifying the first server;
      (ii) an indication of a service network interface specifying the service network interface intended to be communicatively connected to the first server, wherein the service network interface is one of a first network interface and a second network interface of the BMC; and
      (iii) a port number;
   (b) determining whether each of the first network interface and the second network interface is enabled; and
   (c) in response to a determination of whether each of the first network interface and the second network interface is enabled, selecting, based on the determination and the configuration data, a selected network interface to be communicatively connected to the first server by:
      (1) when only the first network interface is determined to be enabled and the second network interface is determined to be disabled, ignoring the indication of the service network interface of the configuration data and utilizing only the indication of the first server and the port number of the configuration data to:
         select the first network interface as the selected network interface, and
         bind the one of the at least two ports of the first network interface indicated by the port number with the first server according the indication of the first server and the port number of the configuration data;
      (2) when only the second network interface is determined to be enabled and the first network interface is determined to be disabled, ignoring the indication of the service network interface of the configuration data and utilizing only the indication of the first server and the port number of the configuration data to:
         select the second network interface as the selected network interface, and
         bind the one of the at least two ports of the second network interface indicated by the port number with the first server according the indication of the first server and the port number of the configuration data; and
      (3) when both the first network interface and the second network interface are determined to be enabled, utilizing all of the indication of the first server, the indication of the service network interface and the port number of the configuration data to:
         select the service network interface as the selected network interface according to the indication of the service network interface of the configuration data, and
         bind the one of the at least two ports of the service network interface indicated by the port number with the first server according to the indication of the first server and the port number of the configuration data.

2. The non-transitory computer-readable medium of claim 1, further comprising computer-executable instructions stored thereon which, when executed by the processor, cause the at least one service of the first server to be available to the host computer.

3. The non-transitory computer-readable medium of claim 2, wherein the binding of the one of the at least two ports with the first server is performed during continuous operation of the BMC.

4. The non-transitory computer-readable medium of claim 1, wherein at least one of the indication of the first server, the indication of the service network interface, and the port number of the configuration data is generated in response to an interaction of a user with a web interface application executing on the remote management computer.

5. A computer system, comprising:
   (a) a remote management computer;
   (b) at least two servers, wherein each of the at least two servers is configured to provide at least one service;
   (c) a baseboard management controller (BMC) of a host computer, wherein the BMC comprises:
      (i) a processor;
      (ii) a first network interface comprising at least two ports;
      (iii) a second network interface comprising at least two ports;
      (iv) a memory storing firmware, wherein the firmware is configured, when executed at the processor, to
         (1) receive, from the remote management computer over a communications link, configuration data for a first server of the at least two servers, wherein the configuration data comprises:
            an indication of the first server specifying the first server;
            an indication of a service network interface specifying the service network interface to be communicatively connected to the first server, wherein the service network interface is one of the first network interface and the second network interface; and
            a port number;
         (2) determine whether each of the first network interface and the second network interface is enabled; and (3) in response to a determination of whether each of the first network interface and the second network interface is enabled, select, based on the determination and the configuration data, a selected network interface to be communicatively connected to the first server by:

(A) when only the first network interface is determined to be enabled and the second network interface is determined to be disabled, ignoring the indication of the service network interface of the configuration data and utilizing only the indication of the first server and the port number of the configuration data to:
select the first network interface as the selected network interface, and
bind the one of the at least two ports of the first network interface indicated by the port number with the first server according to the indication of the first server and the port number of the configuration data;

(B) when only the second network interface is determined to be enabled and the first network interface is determined to be disabled, ignoring the indication of the service network interface of the configuration data and utilizing only the indication of the first server and the port number of the configuration data to:
select the second network interface as the selected network interface, and
bind the one of the at least two ports of the second network interface indicated by the port number with the first server according to the indication of the first server and the port number of the configuration data; and (C) when both the first network interface and the second network interface are determined to be enabled, utilizing all of the indication of the first server, the indication of the service network interface and the port number of the configuration data to:
select the service network interface as the selected network interface according to the indication of the service network interface of the configuration data, and
bind the one of the at least two ports of the service network interface indicated by the port number with the first server according to the indication of the first server and the port number of the configuration data.

6. The computer system of claim 5, wherein the firmware is further configured, when executed, to cause the at least one service of the first server to be available to the host computer.

7. The computer system of claim 6, wherein the binding of the one of the at least two ports with the first server is performed during continuous operation of the BMC.

8. The computer system of claim 5, wherein at least one of the indication of the first server, the indication of the service network interface, and the port number of the configuration data is generated in response to an interaction of a user with the remote management computer.

9. The computer system of claim 8, wherein the interaction of the user is performed with a web interface application executing on the remote management computer.

10. The computer system of claim 5, wherein the communications link comprises an internet connection.

11. The computer system of claim 5, wherein the at least one service comprises at least one of keyboard, video, and mouse (KVM) console redirection, text console redirection, mass storage redirection, floppy drive redirection, USB flash drive redirection, and CD/DVD redirection.

12. The computer system of claim 5, wherein the BMC is configured to function as a management controller for the host computer.

13. A baseboard management controller (BMC) configured to be connected to a host computer, the BMC comprising:

(a) a processor;
(b) a first network interface comprising at least two ports;
(c) a second network interface comprising at least two ports; and
(d) a memory storing firmware, wherein the firmware is configured, when executed at the processor, to
(i) receive, from a remote management computer over a communications link, configuration data for a first server of the at least two servers, wherein the configuration data comprises:
an indication of the first server specifying the first server;
an indication of a service network interface specifying the service network interface to be communicatively connected to the first server, wherein the service network interface is one of the first network interface and the second network interface; and
a port number;
(ii) determine whether each of the first network interface and the second network interface is enabled; and
(iii) in response to a determination of whether each of the first network interface and the second network interface is enabled, select, based on the determination and the configuration data, a selected network interface to be communicatively connected to the first server by:
(1) when only the first network interface is determined to be enabled and the second network interface is determined to be disabled, ignoring the indication of the service network interface of the configuration data and utilizing only the indication of the first server and the port number of the configuration data to:
select the first network interface as the selected network interface, and
bind the one of the at least two ports of the first network interface indicated by the port number with the first server according to the indication of the first server and the port number of the configuration data;
(2) when only the second network interface is determined to be enabled and the first network interface is determined to be disabled, ignoring the indication of the service network interface of the configuration data and utilizing only the indication of the first server and the port number of the configuration data to:
select the second network interface as the selected network interface, and
bind the one of the at least two ports of the second network interface indicated by the port number with the first server according to the indication of the first server and the port number of the configuration data; and
(3) when both the first network interface and the second network interface are determined to be enabled, utilizing all of the indication of the first server, the indication of the service network interface and the port number of the configuration data to:

select the service network interface as the selected network interface according to the indication of the service network interface of the configuration data, and bind the one of the at least two ports of the service network interface indicated by the port number with the first server according to the indication of the first server and the port number of the configuration data.

14. The BMC of claim 13, wherein the firmware is further configured, when executed, to cause the at least one service of the first server to be available to the host computer.

15. The BMC of claim 14, wherein the binding of the one of the at least two ports with the first server is performed during continuous operation of the BMC.

16. The BMC of claim 13, wherein at least one of the indication of the first server, the indication of the service network interface, and the port number of the configuration data is generated in response to an interaction of a user with the remote management computer.

17. The BMC of claim 16, wherein the interaction of the user is performed with a web interface application executing on the remote management computer.

18. The BMC of claim 13, wherein the communications link comprises an internet connection.

19. The BMC of claim 13, wherein the at least one service comprises at least one of keyboard, video, and mouse (KVM) console redirection, text console redirection, mass storage redirection, floppy drive redirection, USB flash drive redirection, and CD/DVD redirection.

* * * * *